United States Patent
Zuberi et al.

(10) Patent No.: US 9,971,050 B2
(45) Date of Patent: May 15, 2018

(54) GENERALIZED INTERNAL MULTIPLE IMAGING

(71) Applicant: King Abdullah University of Science and Technology, Thuwal (SA)

(72) Inventors: Mohammad Akbar Hosain Zuberi, Thuwal (SA); Tariq Alkhalifah, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 464 days.

(21) Appl. No.: 14/288,920

(22) Filed: May 28, 2014

(65) Prior Publication Data

US 2014/0355375 A1    Dec. 4, 2014

Related U.S. Application Data

(60) Provisional application No. 61/827,869, filed on May 28, 2013.

(51) Int. Cl.
G01V 1/28    (2006.01)

(52) U.S. Cl.
CPC .......... G01V 1/28 (2013.01); *G01V 2210/675* (2013.01); *G01V 2210/679* (2013.01)

(58) Field of Classification Search
CPC .................................. G01V 1/28; G01V 1/679
See application file for complete search history.

(56) References Cited

U.S. PATENT DOCUMENTS 7,453,765 B2    11/2008 Ikelle
7,710,821 B2    5/2010 Robertsson et al.
(Continued)

FOREIGN PATENT DOCUMENTS

EP    2048520    4/2009
EP    2270546    1/2011
(Continued)

OTHER PUBLICATIONS

Park, Propagators and Feynman diagrams for laterally heterogeneous elastic media, Geophysics J. Int 2005, 160, 289-301.*
(Continued)

*Primary Examiner* — Hovhannes Baghdasaryan
(74) *Attorney, Agent, or Firm* — Billion & Armitage; Benjamin C. Armitage

(57) ABSTRACT

Various examples are provided for generalized internal multiple imaging (GIMI). In one example, among others, a method includes generating a higher order internal multiple image using a background Green's function and rendering the higher order internal multiple image for presentation. In another example, a system includes a computing device and a generalized internal multiple imaging (GIMI) application executable in the computing device. The GIMI application includes logic that generates a higher order internal multiple image using a background Green's function and logic that renders the higher order internal multiple image for display on a display device. In another example, a non-transitory computer readable medium has a program executable by processing circuitry that generates a higher order internal multiple image using a background Green's function and renders the higher order internal multiple image for display on a display device.

20 Claims, 8 Drawing Sheets

(56) References Cited

U.S. PATENT DOCUMENTS

| | | |
|---|---|---|
| 7,826,307 B2 | 11/2010 | Kitchenside |
| 7,917,317 B2 | 3/2011 | McKeon |
| 7,987,054 B2 | 7/2011 | Anatoly |
| 8,280,695 B2 | 10/2012 | Neelamani et al. |
| 8,300,498 B2 | 10/2012 | Hegge et al. |
| 8,395,965 B2 | 3/2013 | Thomson |
| 8,437,218 B2 | 5/2013 | Dragoset, Jr. et al. |
| 2005/0088913 A1* | 4/2005 | Lecomte .................. 367/51 |
| 2007/0189117 A1 | 8/2007 | Robertsson et al. |
| 2008/0006091 A1 | 1/2008 | McKeon |
| 2008/0162051 A1 | 7/2008 | Ikelle |
| 2009/0092007 A1 | 4/2009 | Kitchenside |
| 2009/0288823 A1 | 11/2009 | Baumstein |
| 2010/0110830 A1 | 5/2010 | Thomson |
| 2010/0135114 A1 | 6/2010 | Teague et al. |
| 2010/0161235 A1 | 6/2010 | Ikelle |
| 2010/0246324 A1 | 9/2010 | Dragoset, Jr. et al. |
| 2010/0302906 A1 | 12/2010 | Liu |
| 2010/0329079 A1 | 12/2010 | Hegge et al. |
| 2011/0128817 A1 | 6/2011 | Keers |
| 2011/0144935 A1 | 6/2011 | McKeon |
| 2011/0147004 A1 | 6/2011 | Neelamani et al. |
| 2011/0199858 A1 | 8/2011 | Otnes et al. |
| 2011/0317521 A1 | 12/2011 | Dragoset, Jr. et al. |
| 2012/0041682 A1 | 2/2012 | Ramirez-Perez et al. |

FOREIGN PATENT DOCUMENTS

| | | |
|---|---|---|
| EP | 2353036 | 8/2011 |
| EP | 2414865 | 2/2012 |
| EP | 2435860 | 4/2012 |
| EP | 2537049 | 12/2012 |
| WO | WO2005019868 | 3/2005 |
| WO | WO2007137092 | 11/2007 |
| WO | WO2008008052 | 1/2008 |
| WO | WO2008053135 | 5/2008 |
| WO | WO2008081156 | 7/2008 |
| WO | WO2008112036 | 9/2008 |
| WO | WO2009051899 | 4/2009 |
| WO | WO2009051900 | 4/2009 |
| WO | WO2010065653 | 6/2010 |
| WO | WO2010117499 | 10/2010 |
| WO | WO2010138409 | 12/2010 |
| WO | WO2011103297 | 8/2011 |
| WO | WO2012005921 | 1/2012 |
| WO | WO2012021218 | 2/2012 |
| WO | WO2012074612 | 6/2012 |

OTHER PUBLICATIONS

Behura, J., K. Wapenaar, and R. Snieder, Nov. 2012, 685, in Newton-Marchenko-Rose Imaging: SEG, 1-6.

Malcolm, A., M. De Hoop, and B. Ursin, Mar. 2011, Recursive imaging with multiply scattered waves using partial image regularization: A north sea case study: Geophysics, 76, B33-B42.

Malcolm, A. E., B. Ursin, and M. V. De Hoop, Mar. 2009, Seismic imaging and illumination with internal multiples: Geophysical Journal International, 176, 847-864, published on line Dec. 2008.

Wapenaar, K., F. Broggini, and R. Snieder, Aug. 2012, Creating a virtual source inside a medium from reflection data: heuristic derivation and stationary—phase analysis: Geophysical Journal International, 190, 1020-1024.

Wapenaar, K., and J. Fokkema, Aug. 2006, Green's function representations for seismic interferometry: Geophysics, 71, SI33-SI46.

Wong, M., B. Biondi, and S. Ronen, Nov. 2012, 706, Imaging with multiples using linearized full-wave inversion: SEG, 1-5.

Wong, Least-squares reverse time migration/inversion for ocean bottom data: a case study, SEG San Antonio 2011 Annual Meeting, Sep. 2011.

M. A. H. Zuberi, Selective Interferometric Imaging of Internal Multiples; 75th EAGE Conference & Exhibition incorporating SPE EUROPEC 2013, London, UK, Jun. 2013.

Zuberi et al., Imaging by forward propagating the data: theory and application, Geophysical Prospecting, Jun. 2013, 61 (Suppl. 1), 248-267.

* cited by examiner

Table 1: Definitions of Feynman diagrams

Points:
- ○ Represents a point on the surface.
- ● Represents a point in the volume $V$ enclosed by the surface $S$.
- ⊛ Image point in the volume $V$.

Lines:
- ——— Background Green's function
- ∿∿∿ Total Green's function
- - - - - Complex conjugate of background Green's function
- ⋯∿⋯ Complex conjugate of total Green's function

Vertices:

Bare vertex. It is the multiplication of the indicated Green's functions. $G(y,x)G_0(y',x)$.

Solid circle at the vertex represents multiplication by $\omega^2 \delta v(x)$ and integration over the volume. $\int_V \omega^2 \delta v(x)(\cdots)d^3x$.

Hollow circle at the vertex only represents integration over the surface. $\int_S (\cdots) d^2y$.

Represents the image point inside the volume $V$. Otherwise exactly like the bare vertex.

Trees: Diagrams with open ends will be called tree diagrams. Lines which have vertices at both ends will be called internal lines. Lines which have a vertex at one end only will be called external lines.

Loops: Loop represents the imaging process. As explained below.

Labels: Unlike equations (4), (5) and (6), any function or number label at the vertex has to be multiplied by the product of Green's functions. If the vertex represents an integral, the labeled term has to be part of the integrand.

Convention: The diagrams have to be written in the same order as actual operations. When cross-correlations are involved we have to stick to a convention for terms to conjugate. We shall always conjugate the preceding step. For example, we use $GG_0^* = G(GG_0^*)^* = G_0(G(GG_0^*)^*)^*$ for our three stage procedure. Therefore what we draw is (figure on left) $G_0 G^* G G_0^*$. In general the sequence of operations do not have to follow a particular order.

FIG. 1

GENERALIZED INTERNAL MULTIPLE IMAGING

CROSS REFERENCE TO RELATED APPLICATIONS

This application claims priority to U.S. provisional application entitled "GENERALIZED INTERNAL MULTIPLE IMAGING" having Ser. No. 61/827,869, filed May 28, 2013, the entirety of which is hereby incorporated by reference.

BACKGROUND

Seismic imaging is widely used in exploration by the oil and gas industry. Conventional imaging techniques can image single scattering energy. For example, reverse time migration (RTM) propagates data through a velocity model to provide imaging information. Complex propagation paths can produce internal multiples that are seen as noise in the imaged data.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 illustrates examples of definitions of Feynman diagrams used in accordance with various embodiments of the present disclosure.

DETAILED DESCRIPTION

Figure 2A:
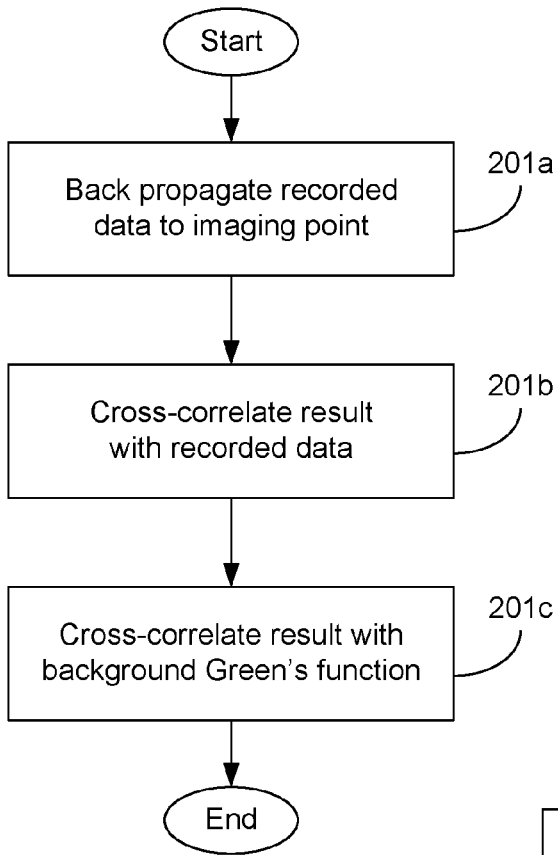
FIG. 2A is flowchart illustrating an example of double scattering imaging and FIG. 2B is flowchart illustrating an example of generalized internal multiple imaging (GIMI) in accordance with various embodiments of the present disclosure.

Disclosed herein are various embodiments related to generalized internal multiple imaging (GIMI). Reference will now be made in detail to the description of the embodiments as illustrated in the drawings, wherein like reference numbers indicate like parts throughout the several views.

Internal multiples are surface recordings which were scattered more than once by subsurface scatterers. Conventional imaging techniques can image single scattering energy by accessing a smooth model of subsurface velocity. In order for reverse time migration (RTM) to image the internal multiples, a sharp velocity contrast in the velocity model is needed. In conventional seismic imaging, internal multiples can deteriorate the image if they are not taken care of by the imaging process. However, the internal multiples may be the only source of information about a reflector. Therefore it can be important to use the internal multiples for imaging as they can provide valuable information about the subsurface.

In an embodiment herein, a generalized internal multiple imaging (GIMI) procedure is disclosed for imaging the internal multiples using only a background Green's function (which does not involve any scattering). In this case, a sharp velocity contrast in the velocity model is not needed for the analysis. Furthermore, the GIMI procedure will allow imaging of the internal multiples of a specific order separately or of many orders together. To better illustrate the physics behind the mathematics, Feynman-like diagrams will be used to describe the seismic interferometry.

When both source and receiver points are on the surface, the Lippmann-Schwinger equation is given by:

$$G(y',y)=G_0(y',y)+\omega^2 \int_r \delta \upsilon(x) G(y',x) G_0(x,y) d^3 x, \qquad (1)$$

where $G_0$ is the background Green's function, G is the total Green's function and $\omega$ is the angular frequency. All the Green's functions in this disclosure are in frequency domain. $\delta \upsilon(x)$ is the slowness (reciprocal of medium velocity) perturbation. The surface-to-volume version of the Lippmann-Schwinger equation is given as:

$$G(y,x)=G_0(y,x)+\omega^2 \int_r \delta \upsilon(x') G(y,x') G_0(x,x') d^3 x'. \qquad (2)$$

The total field, based on the cross-correlation interferometric theory, also satisfies the following relationship:

$$G^*_0(x',x)+G_0(x',x) \approx \int_S G^*_0(y,x) G_0(x',y) d^2 y. \qquad (3)$$

With a Born scattering series, cross-correlation with a background Green's function quickly becomes very cumbersome. To simplify the analysis, Feynman diagrams will be used to represent the equations. Feynman diagrams have proved to be an invaluable tool to analyze the terms of perturbation expansion for scattering processes in Quantum Field Theory (QFT). Similar diagrams will be used for the terms of the Born series for scattering processes in seismic imaging. Referring to FIG. 1, TABLE 1 shows definitions of Feynman diagrams used in this disclosure.

Using the Feynman diagrams of FIG. 1, equation (1) can be represented as:

$$(4)$$

where a hollow circle (○) denotes a point on the surface, a solid circle (●) denotes a point inside the volume, a wiggly line (∿∿) represents the background Green's function and a solid line (—) represents the total Green's function. Similarly equations (2) and (3) can be represented respectively as:

$$(5)$$

$$(6)$$

where the dotted straight line (-------) represents the complex conjugate of the total Green's function. In equations (4), (5) and (6) endpoints and vertices are labeled to illustrate their meaning in the context of equations (1), (2) and (3) and will not be labeled in this fashion onwards. Labels on vertices will have a different meaning which will be defined with the rules in FIG. 1 for drawing Feynman diagrams. The wavefield is assumed to be acoustic.

The lines in the Feynman diagrams do not have directions marked by arrows because Green's functions are symmetric. Thus it does not make a difference which direction is considered. For convenience, source points are considered to be on the left and receiver points on right (the surface points as hollow circles), and both will be drawn at the same level. Separation of vertices and endpoints just depicts different dummy variables for integration. Also note that for surface seismic, the external lines will always end on the surface and loop diagrams do not have any external lines. Equation (6) shows that a surface vertex can be removed when it represents a cross-correlation. This enables us to reduce our diagrams to those which do not contain any surface vertices. Such diagrams will be referred to as being in irreducible form.

Single scatterings can be imaged in various ways. One example is Kirchhoff migration. The Reverse Time Migration (RTM) also images single scattering and if the velocity model is such that it does not produce any internal scatterings in the forward propagation step, the single scattering is the main contribution to the image.

Although direct arrivals can be of use in certain situations, in conventional RTM direct arrivals are removed and only the scattered part is considered, which is the second term on the right hand side (r.h.s.) of equation (4). The imaging process can be defined as closing the loop in a surface-to-surface diagram by cross-correlation at both ends using surface-to-volume background Green's functions, where the point where they end in the volume is the image point ($\otimes$). Summation over frequency of the final result is implied. If there was a scatterer at the image point in the subsurface the total phase around the loop would be zero and the zero-lag cross-correlation will give non-zero amplitude at that point. The RTM can be represented as:

$$\text{(7)}$$

The first term on the r.h.s. of equation (7) represents the imaging of single scattering or:

$$\text{(8)}$$

$$\equiv \iint G_0^*(x_i, y) \left[ \int \omega^2 G_0(x, y) \delta \varpi(x) G_0(y', x) d^3x \right] G_0^*(x_i, y') d^2y d^2y'.$$

To consider higher order scattering, the second term on the r.h.s. of equation (7) is examined. In the second term of equation (7), vertices involving cross-correlation at the surface can be further reduced by using equation (6) as follows:

$$\text{(9)}$$

Checking the total phase of each of the four terms in irreducible form, the fourth term on the r.h.s. of equation (9) will not give a zero phase at any image point. On the other hand, the first term on the r.h.s. of equation (9) will have a zero phase when the image point ($\otimes$) corresponds to either of the two vertices ($\bullet$), which represent the scatters. The second term on the r.h.s. of equation (9) gives a zero phase when the image point corresponds to the first (or left) vertex and the third term on the r.h.s. of equation (9) gives a zero phase when the image point corresponds to the second (or right) vertex. Any of the first three terms of equation (9) may also give a zero phase at positions other than the vertices but only one term will contribute in that case which will be weaker in amplitude than the actual scatterer position which gets contributions from two terms. Such noise can come from other higher order terms in equation (7) (which have not been considered), and may be referred to as crosstalk. Also note that since volume vertices represent integration over the volume, it may be that these two variables have same position. In that case, equation (9) will be kinematically equivalent to single scattering imaging but, because of multiplication with the square of perturbation term, its amplitude will be lower.

The r.h.s. of equation (7) shows the first two terms of the infinite Born series. For the series to converge, the terms decrease in magnitude as the order gets higher. In the diagrams, each subsurface vertex ($\bullet$) involves a multiplication by the perturbation term. Therefore, if the perturbation term is sufficiently small, the series will converge. This means that although RTM images includes the second term of equation (7), its amplitude will be much weaker than the first term.

The discussion above suggests that, in order to image the double scattering in the subsurface, the double scattering term should be isolated or should appear as the leading order term in a series. To accomplish this, the following three stage procedure (illustrated in FIG. 2A) is suggested.

1. At 201a, back propagate the scattered field recorded on the surface to the imaging point in the volume.
2. At 210b, cross-correlate the result of the back propagation with the recorded data.
3. At 210b, cross-correlate the result of the second stage with the surface-to-volume background Green's function (at the image point in the subsurface).

In diagram form, this can be represented as:

$$\text{(10)}$$

Equation (10) shows the leading order term after using equation (5) for the total Green's functions. Note that this leading order term of equation (10) has two subsurface vertices. To see that the scatterers will be imaged, the leading order term is rewritten in its irreducible form. Since there are three surface vertices and each reduction according to equation (6) will give two terms, we will have 8 (or $2^3$) irreducible terms for the leading order.

$$\text{(11)}$$

$$\text{[diagram]} \approx \triangle + \triangle + \triangle + \triangle + \triangle + \triangle + \triangle + \triangle$$

As before, when the image point corresponds to the left vertex, the third, fourth, fifth and sixth terms on the r.h.s. of equation (11) contribute to the image. When the image point is on the right vertex, the first, third, sixth and eight terms on the r.h.s. of equation (11) contribute. The second and seventh terms do not give a zero phase for any position of the image point.

For the velocity model in the examples, crosstalk noise may also be reduced if the negative times are ignored after the first stage of the procedure (i.e., back propagation of the data). Note that four of the eight irreducible diagrams of equation (11) are complex conjugates of each other. Therefore, a background zero phase similar to the low wavelength noise in conventional RTM can be present. Application of a Laplacian filter at the end of imaging can remove such noise.

This analysis can be extended to a general pattern for imaging higher order internal multiples. Note that, instead of the three stage procedure described above, the diagram on the left hand side (l.h.s.) of equation (10) can be interpreted as the flow chart illustrated in FIG. 2B for the GIMI procedure based upon the order of scattering to be evaluated.

Beginning with 203, the data is back propagated to the imaging point.
  Next in 206, the data is cross-correlated with itself N−1 times, where N is the order of scattering.
  Then in 209, the result is cross-correlated with the background Green's function (from surface to image point).

Physically this means:
  Back propagate the receiver (or source) to the imaging point.
  Cross-correlate the data with itself N−1 times.
  Back propagate the source (or receiver) gathers.

Therefore, to image Nth order internal multiples, the data is cross-correlated N times with itself and the imaging condition is then applied.

For example, the third order internal multiple would be imaged like:

$$\text{(12)}$$

$$\text{[diagram]} \approx \triangle + \triangle + \triangle + \triangle + \triangle + \triangle + \triangle + \triangle + \triangle + \triangle + \triangle + \triangle + \triangle + \triangle + \triangle$$

The l.h.s. of equation (12) involves three volume vertices (third order scattering) and four surface vertices. The four surface vertices will in give $2^4$ terms in irreducible form. In general, for Nth order scattering, there are N+1 surface vertices and therefore $2^{N+1}$ terms in the irreducible form for the leading order term. Again, it is possible to determine which terms in the irreducible form contribute to which imaging points. As there are a larger number of terms in irreducible form, more crosstalk will be present due to the zero phase at wrong imaging points. Although its amplitude relative to the correct image points (which receive contributions from more than one term) will be lower, the noise will appear in more places.

From the diagrams on the l.h.s. of equations (10) and (12), it can be seen that the order of the GIMI procedure to image internal multiples is not unique. Examples of four possible ways to image the double scattering include:

1. Back propagate the surface data to the image point, cross-correlate the result with data again and cross-correlate the result with back ground Green's function from surface to the image point.
2. Back propagate the surface data to the image point, forward propagate the result from image point to surface and cross-correlate the result with surface data again.
3. Back propagate the surface data to the image point, and auto-correlate the result.
4. Cross-correlate the background Green's functions from surface to image point with itself and cross-correlate the result with the surface data.

In general for N (with N≥2) order scattering, there are N+2 ways to image that order of internal multiples. For N=1 there are only two ways.

In addition, by adding each of the imaging terms before closing the loop for imaging, different orders of internal scattering may be imaged together. The imaging being processed may be rendered and presented in an appropriate format for a users' evaluation. For example, the rendered imaging can be graphically displayed on a display device or provided in another imaging format (e.g., printed). The processed imaging may also be stored in memory for later access by the user.

The background Green's function can be obtained by calculating the travel times using an eikonal equation. Other methods for travel time computation may also be used, which may be based upon the first arrivals. In this way, the procedure may be applied to other types of medium which admit wave solutions in form of Green's functions. This is true for anisotropic media. The GIMI procedure would be able to image multiple internal scatterings without the need for wave field extrapolation, rather travel time computation (e.g., using the eikinal equation) can be used, which is computationally inexpensive.

In equations (10) and (11), crosstalk terms exist resulting in artifacts in the image of first-order multiples. The crosstalk is also present in the single-scattering image as well. To suppress such noise, a dot product (zero-lag cross-correlation) of the modeled data is fit to recorded surface data using, e.g., a least-square formulation of the imaging process. The initial image can be used to model the scatterers. For single scattering, the initial image I is multiplied by the back-propagated wave field and convolved again with the background Greens function to the surface, as follows $$\text{(13)}$$

$$\text{[diagrams]}$$

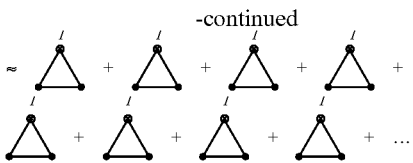

In equation (13), the irreducible form is the same as in equation (11) except for the multiplication with I. If I represents the second order internal multiple image in equation (11), then equation (13) is a product of equations (11) and (13). This is just a squaring of the image.

Figure 3:
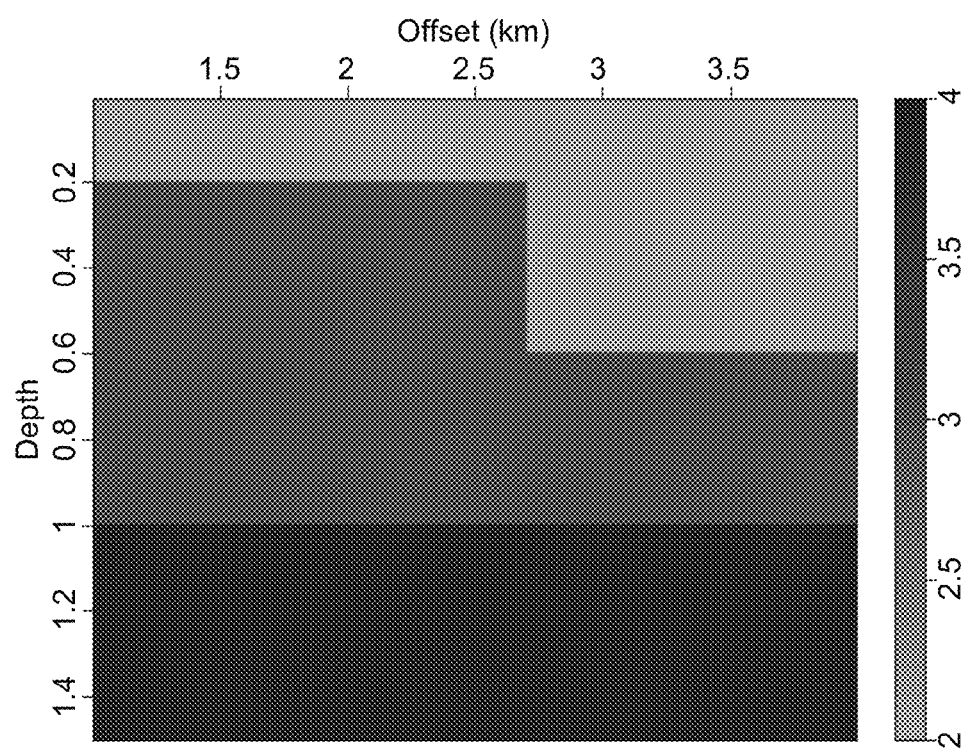
FIGS. 3 and 6 are examples of velocity models used for testing of the GIMI in accordance with various embodiments of the present disclosure.
Figure 4A:
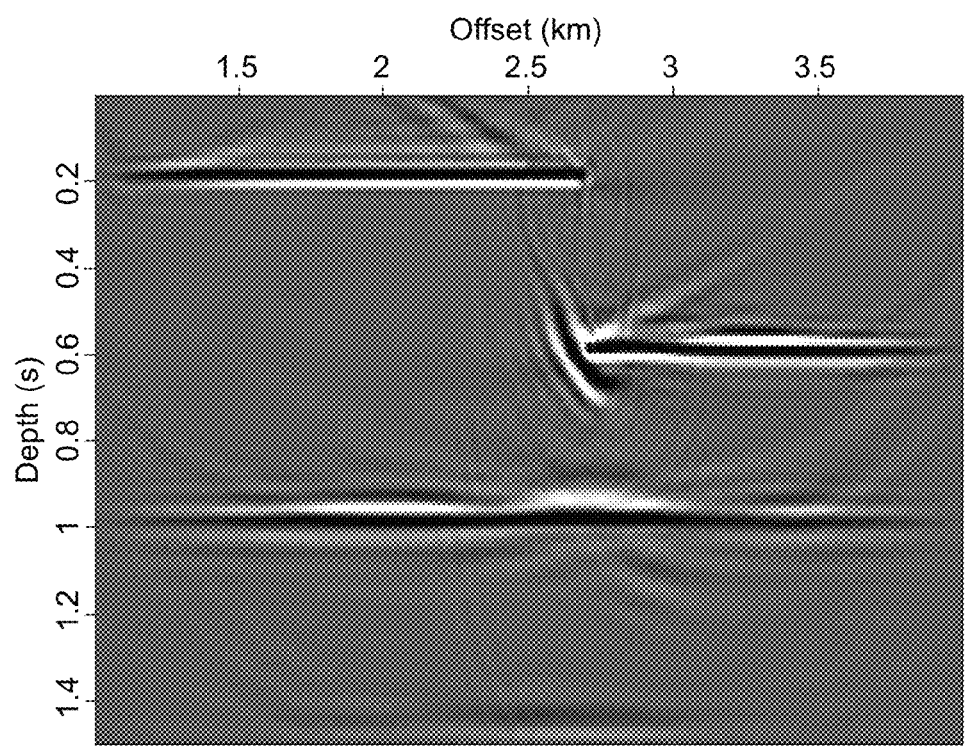
FIGS. 4A-4C, 5A-5C, and 7A-7C are GIMI images produced from the velocity models of FIGS. 3 and 6 in accordance with various embodiments of the present disclosure.
Figure 4B:
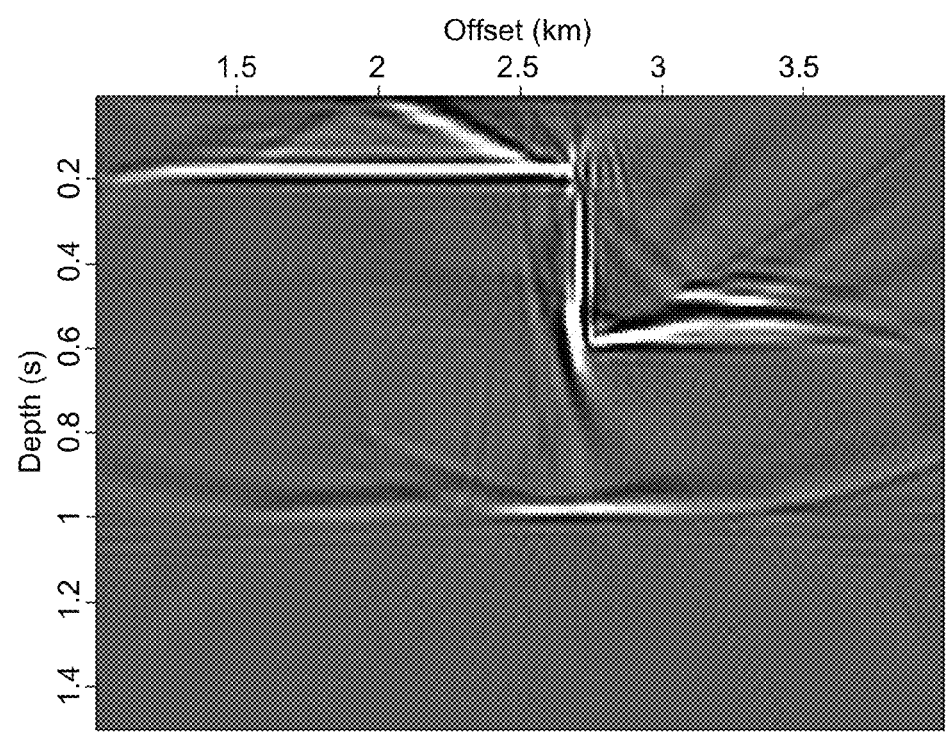
Figure 4C:
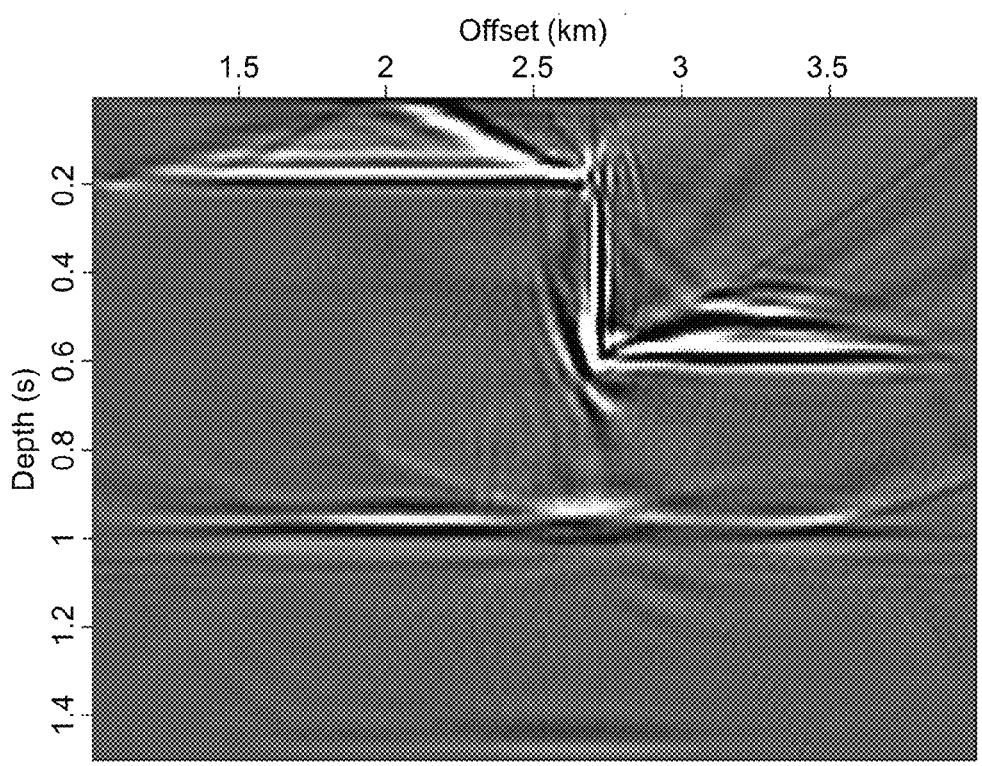
Figure 5A:
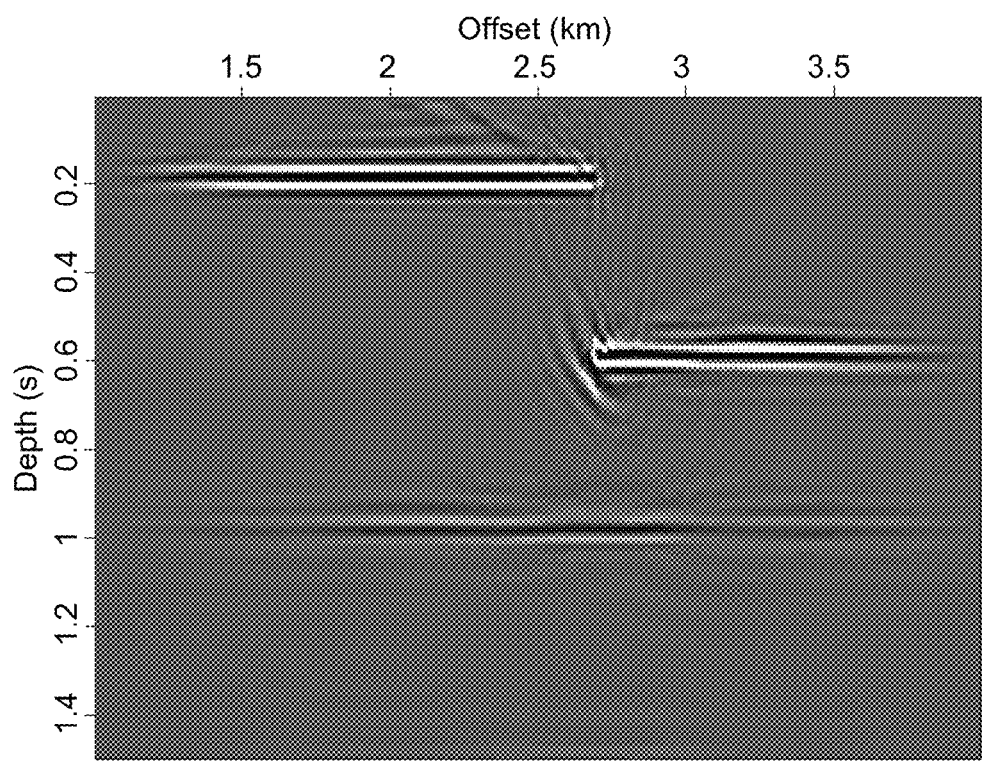
Figure 5B:
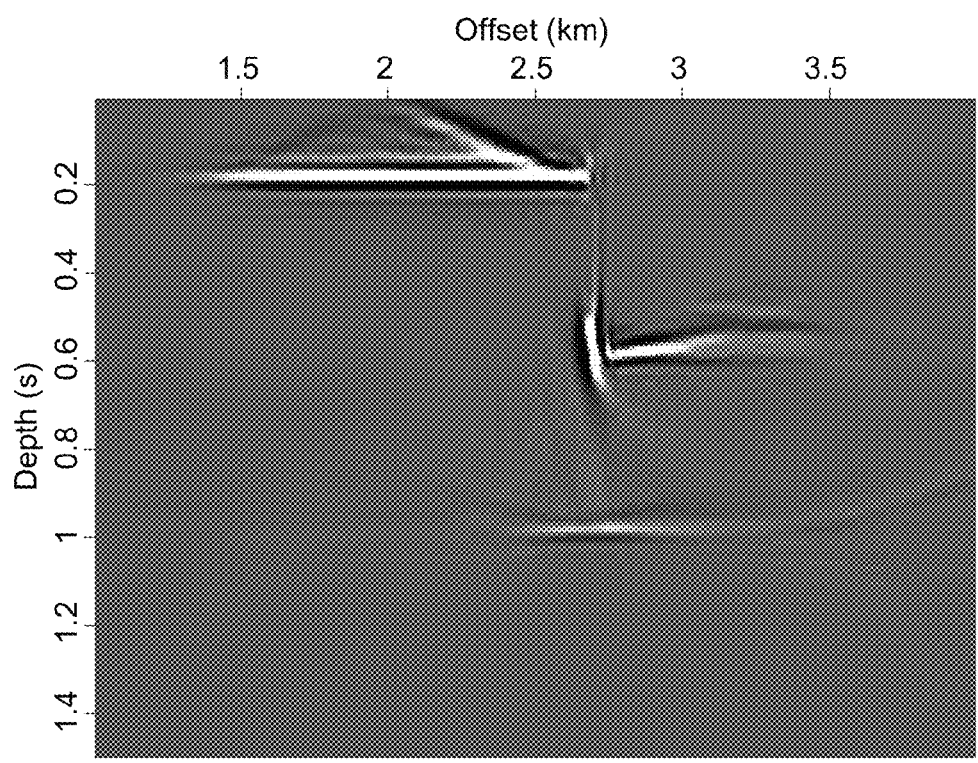
Figure 5C:
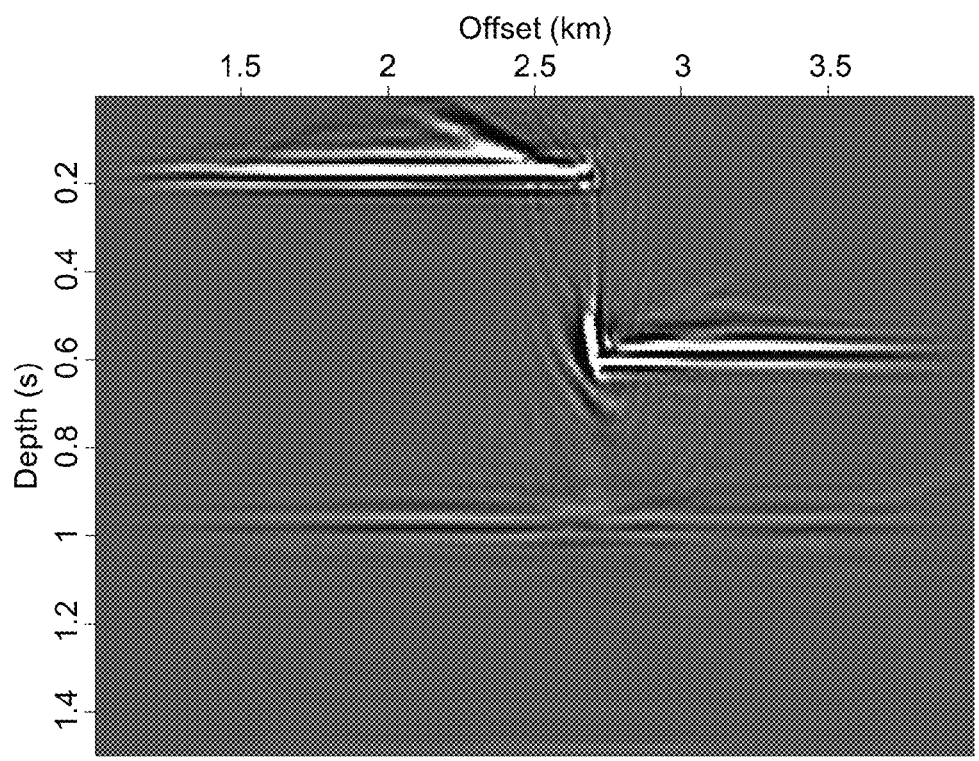

The GIMI process was tested on a simple model shown in FIG. 3. In the velocity model of FIG. 3, the vertical reflector just before 3 km horizontal location was not illuminated by the single-scattering recorded energy on the surface. It, however, was illuminated by a double bounce using the horizontal reflector at depth 0.6 km. Indeed, in the single scattering image of FIG. 4A, it can be seen that the vertical reflector is not visible. However, when the second-order term is imaged, it can be seen in the second order Born scattering term in FIG. 4B that the reflector is clearly visible. The summed image in FIG. 4C clearly shows all the reflectors. The images in FIGS. 4A-4C include crosstalk noise. To suppress the cross-talk noise, the dot product approach described earlier above was used. FIGS. 5A-5C show the images corresponding to FIGS. 4A-4C after crosstalk suppression has been applied. The amount of noise has been visibly reduced.

Figure 6:
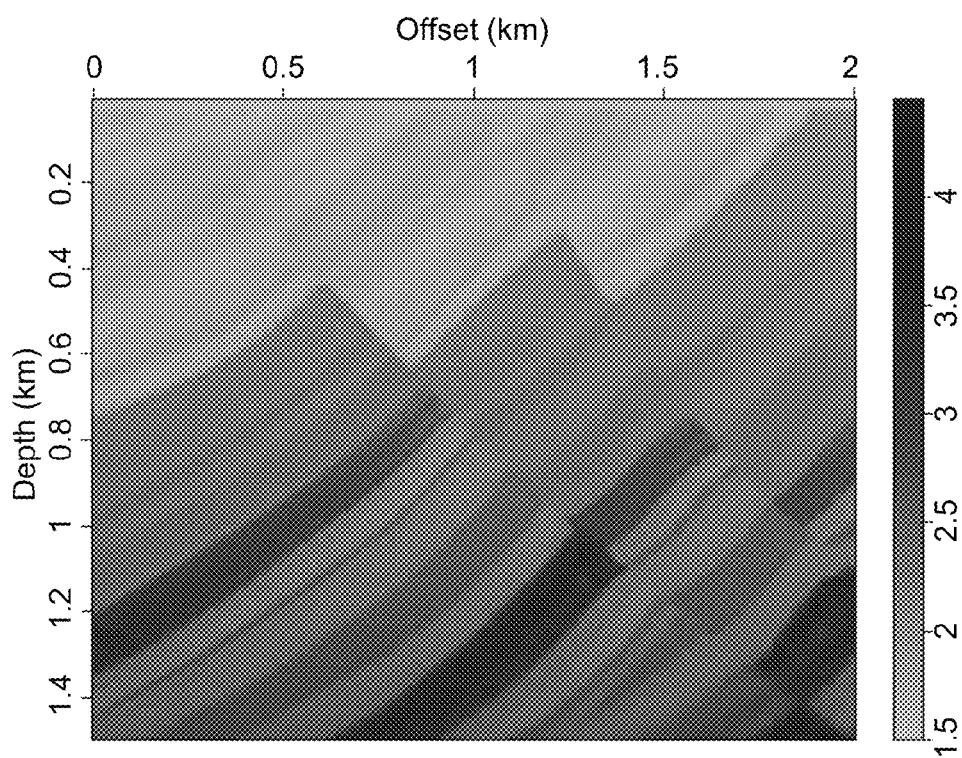
Figure 7A:
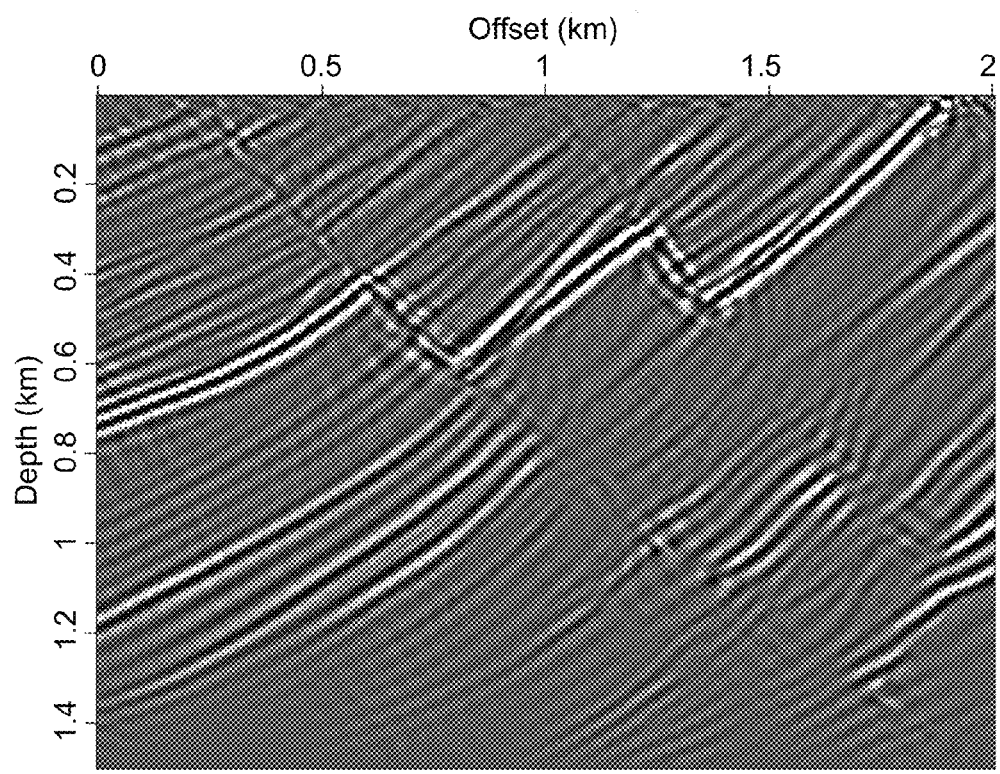
Figure 7B:
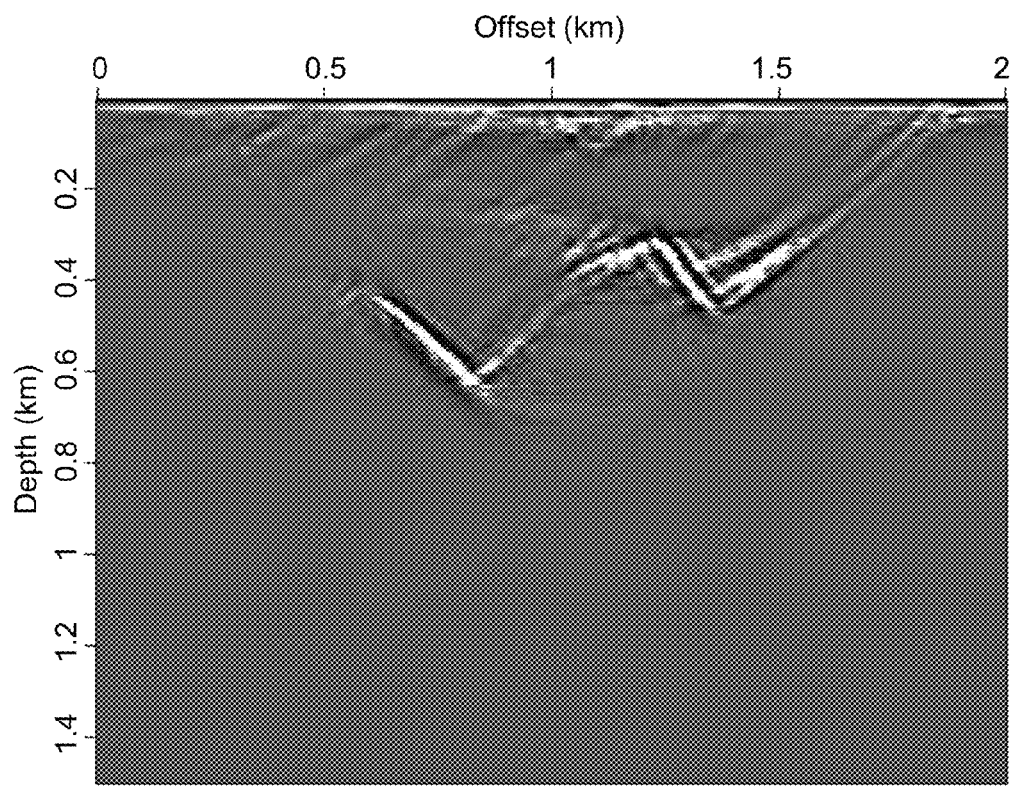
Figure 7C:
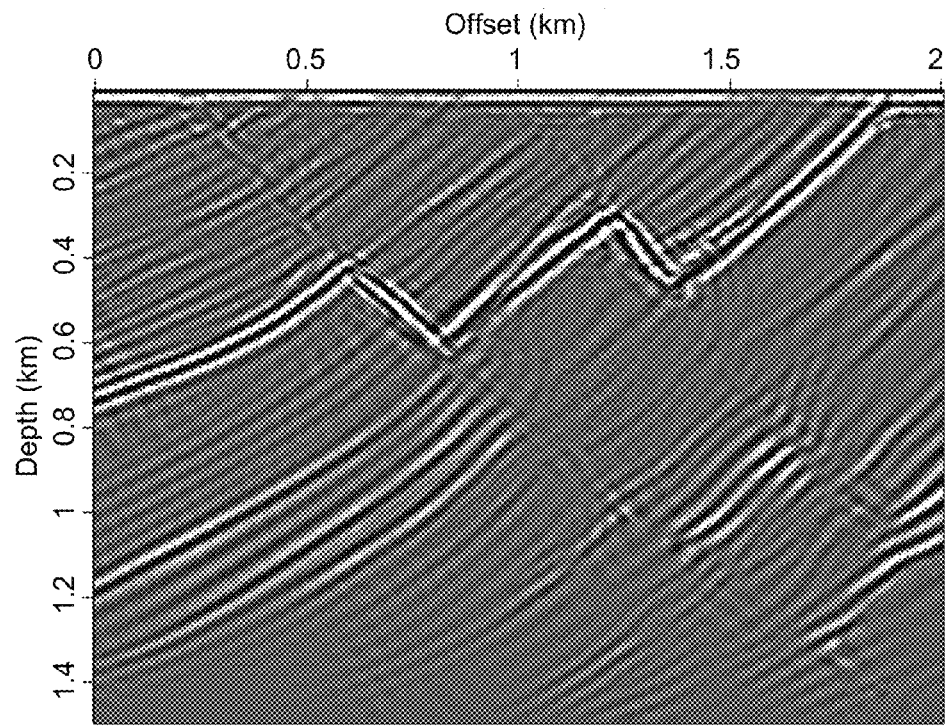

The GIMI process was also tested on a more complicated model, given by a portion from the Marmousi velocity model shown in FIG. 6. FIGS. 7A-7C show the images obtained after crosstalk suppression. FIG. 7A shows the single scattering image and FIG. 7B shows the second order Born scattering term. FIG. 7C shows the summed image with the image points which took part in double bounce. These are not the only points involved in multiple scattering, but are the most prominent ones as the velocity contrast was high.

Figure 8:
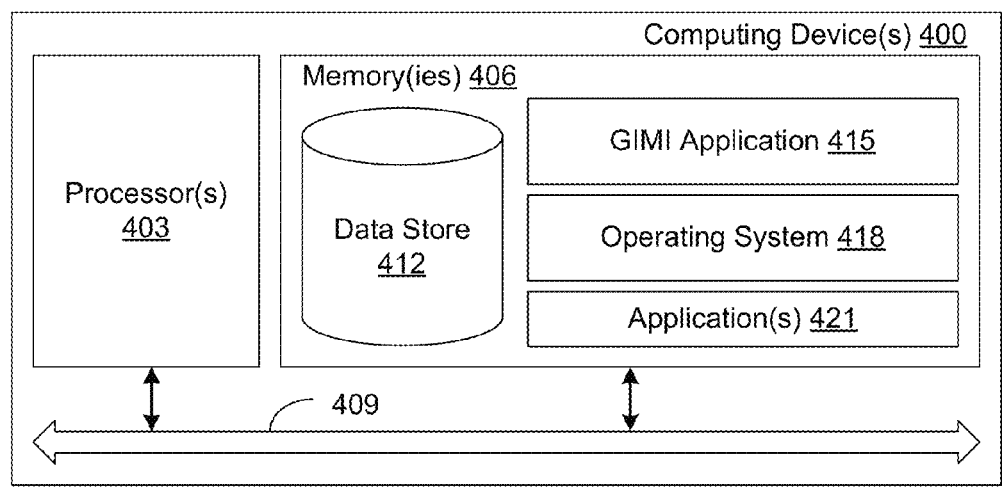
FIG. 8 is a schematic block diagram of a computing device in accordance with various embodiments of the present disclosure.

With reference to FIG. 8, shown is a schematic block diagram of a computing device 400 according to various embodiments of the present disclosure. The computing device 400 includes at least one processor circuit, for example, having a processor 403 and a memory 406, both of which are coupled to a local interface 409. To this end, the computing device 400 may comprise, for example, at least one server computer or like device. The local interface 409 may comprise, for example, a data bus with an accompanying address/control bus or other bus structure as can be appreciated. A display device coupled to the computing device 400 allows rendered information to be displayed.

Stored in the memory 406 are both data and several components that are executable by the processor 403. In particular, stored in the memory 406 and executable by the processor 403 may be a GIMI application 415, an operating system 418, and/or other applications 421. Also stored in the memory 406 may be a data store 412 and other data.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript, Perl, PHP, Visual Basic®, Python®, Ruby, Delphi®, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the GIMI application 415, application(s) 421, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Figure 2B:
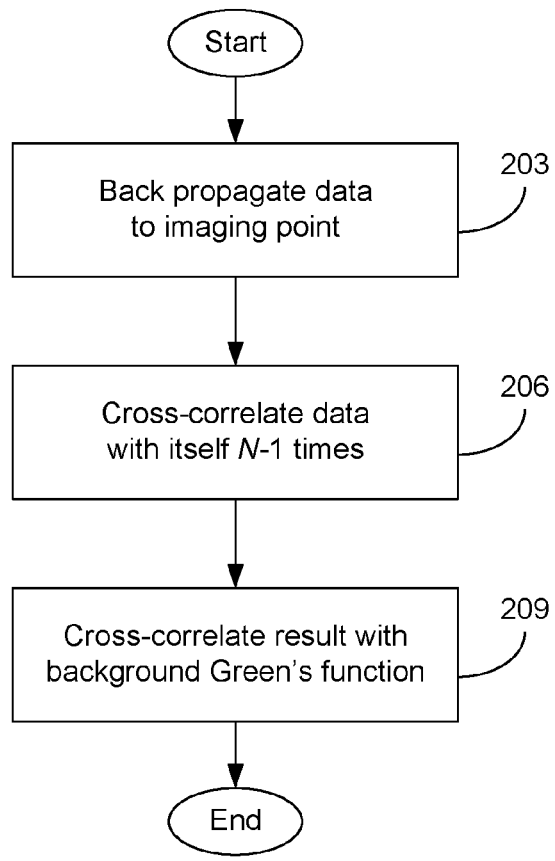

Although the flowcharts of FIGS. 2A and 2B show a specific order of execution, it is understood that the order of execution may differ from that which is depicted. For example, the order of execution of two or more blocks may be scrambled relative to the order shown. Also, two or more blocks shown in succession in FIGS. 2A and 2B may be executed concurrently or with partial concurrence. Further, in some embodiments, one or more of the blocks shown in FIGS. 2A and 2B may be skipped or omitted (in favor, e.g., measured travel times). In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the GIMI application 415 and/or application(s) 421, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method for imaging subsurface features using a seismic surface recording, comprising:
   generating, by a computing device, a higher order internal multiple image from internal multiples data from a collected seismic surface recording including data scattered by multiple subsurface scatterers using a background Green's function without modeling subsurface scatterers;
   rendering, by the computing device, the higher order internal multiple image for presentation by a display device; and
   graphically displaying the higher order multiple image on the display device, with said image differentiating subsurface structures.

2. The method of claim 1, wherein generating the higher order internal multiple image comprises:
   back propagating the internal multiples data to an imaging point to produce back propagated data;
   cross-correlating the internal multiples data with itself, where the cross-correlating comprises cross-correlation with the back propagated data; and
   cross-correlating a result of the cross-correlating of the internal multiples data with itself with the background Green's function.

3. The method of claim 2, wherein cross-correlating the internal multiples data with itself comprises cross-correlating the internal multiples data with itself a plurality of times by cross-correlating the internal multiples data with itself at least once before the cross-correlation with the back propagated data.

4. The method of claim 3, wherein the plurality of cross-correlations are based upon the order of scattering.

5. The method of claim 4, wherein the data is cross-correlated with itself N−1 times, where N is the order of scattering.

6. The method of claim 1, wherein the higher order internal multiple image is generated without modeling scatterers.

7. The method of claim 1, wherein the background Green's function is obtained using an eikonal equation.

8. A system for internal multiple imaging to identify subsurface structures comprising:
   a computing device; and
   a generalized internal multiple imaging application executable in the computing device, where execution of the generalized internal multiple imaging application causes the computing device to:
   generate a higher order internal multiple image from internal multiples data from a collected seismic surface recording having data scattered by multiple subsurface scatterers using a background Green's function without modeling subsurface scatterers; and
   render the higher order internal multiple image for display on a display device, with subsurface structures being distinguished in said image.

9. The system of claim 8, wherein generating the higher order internal multiple image comprises:
  back propagating the internal multiples data to an imaging point to produce back propagated data;
  cross-correlating the internal multiples data with itself, where the cross-correlating comprises cross-correlation with the back propagated data; and
  cross-correlating a result of the cross-correlating of the internal multiples data with itself with the background Green's function.

10. The system of claim 9, wherein cross-correlating the internal multiples data with itself comprises cross-correlating the internal multiples data with itself a plurality of times by cross-correlating the internal multiples data with itself at least once before the cross-correlation with the back propagated data.

11. The system of claim 10, wherein the plurality of cross-correlations are based upon the order of scattering.

12. The system of claim 9, wherein a dot product is used to suppress cross-talk noise in the higher order internal multiple image.

13. The system of claim 8, wherein the higher order internal multiple image is generated without modeling scatterers.

14. A non-transitory computer readable medium having a program for imaging subsurface features within a seismic surface recording that, when executed by processing circuitry including a processor, causes the processing circuitry to:
  generate a higher order internal multiple image from internal multiples data from a collected seismic surface recording including data scattered by multiple subsurface scatterers using a background Green's function without modeling subsurface scatterers; and
  render the higher order internal multiple image for display on a display device to distinguish subsurface features captured in the seismic surface recording.

15. The non-transitory computer readable medium of claim 14, wherein generating the higher order internal multiple image comprises:
  back propagating the internal multiples data to an imaging point to produce back propagated data;
  cross-correlating the internal multiples data with itself, where the cross-correlating comprises cross-correlation with the back propagated data; and
  cross-correlating a result of the cross-correlating of the internal multiples data with itself with the background Green's function.

16. The non-transitory computer readable medium of claim 15, wherein cross-correlating the internal multiples data with itself comprises cross-correlating the internal multiples data with itself a plurality of times by cross-correlating the internal multiples data with itself at least once before the cross-correlation with the back propagated data.

17. The non-transitory computer readable medium of claim 16, wherein the plurality of cross-correlations are based upon the order of scattering.

18. The non-transitory computer readable medium of claim 14, wherein the higher order internal multiple image is generated without modeling scatterers.

19. The non-transitory computer readable medium of claim 15, wherein zero-lag cross-correlation is used to suppress cross-talk noise in the higher order internal multiple image.

20. The non-transitory computer readable medium of claim 14, wherein the background Green's function is obtained using an eikonal equation.

\* \* \* \* \*